United States Patent
Durand et al.

(10) Patent No.: US 9,469,401 B2
(45) Date of Patent: Oct. 18, 2016

(54) TOILET AREA FOR AN AIRCRAFT CABIN, IN PARTICULAR FOR A FLYING WING AIRCRAFT

(71) Applicant: Airbus Operations (SAS), Toulouse (FR)

(72) Inventors: Yves Durand, Aussonne (FR); Bernard Guering, Montrabe (FR)

(73) Assignee: AIRBUS OPERATIONS (SAS), Toulouse (FR)

( * ) Notice: Subject to any disclaimer, the term of this patent is extended or adjusted under 35 U.S.C. 154(b) by 387 days.

(21) Appl. No.: 14/132,982

(22) Filed: Dec. 18, 2013

(65) Prior Publication Data

US 2014/0165285 A1    Jun. 19, 2014

(30) Foreign Application Priority Data

Dec. 18, 2012 (FR) .................................. 12 62249

(51) Int. Cl.
*B64D 11/02* (2006.01)
*B64D 25/08* (2006.01)

(52) U.S. Cl.
CPC ............... *B64D 11/02* (2013.01); *B64D 25/08* (2013.01)

(58) Field of Classification Search
CPC ............................. B64D 11/02; B64D 25/08
USPC ............................................................. 4/316
See application file for complete search history.

(56) References Cited

U.S. PATENT DOCUMENTS

| 5,474,260 | A | 12/1995 | Schwertfeger et al. |
| 6,007,025 | A | 12/1999 | Coughren et al. |
| 2002/0062521 | A1 | 5/2002 | Itakura |
| 2010/0193629 | A1 | 8/2010 | Breit et al. |
| 2010/0237193 | A1 | 9/2010 | Yoshizaki |

FOREIGN PATENT DOCUMENTS

| EP | 0606920 | 7/1994 |
| EP | 0850833 | 7/1998 |
| EP | 1209078 | 5/2002 |
| EP | 2213571 | 8/2010 |
| EP | 2230174 | 9/2010 |

OTHER PUBLICATIONS

French Search Report, Aug. 23, 2013.

*Primary Examiner* — Tuan N Nguyen
(74) *Attorney, Agent, or Firm* — Greer, Burns & Crain, Ltd.

(57) ABSTRACT

A toilet area for an aircraft cabin comprising an access door and housing a toilet bowl. The toilet area also comprises an evacuation exit, the access door occupying a closed position in the toilet area in a toilet configuration and a folded position in the toilet area in an evacuation configuration. Usage in particular in a flying wing aircraft is provided.

12 Claims, 8 Drawing Sheets

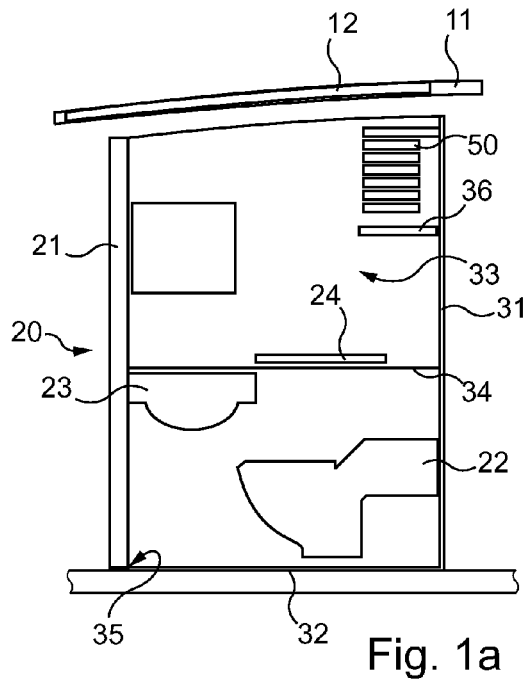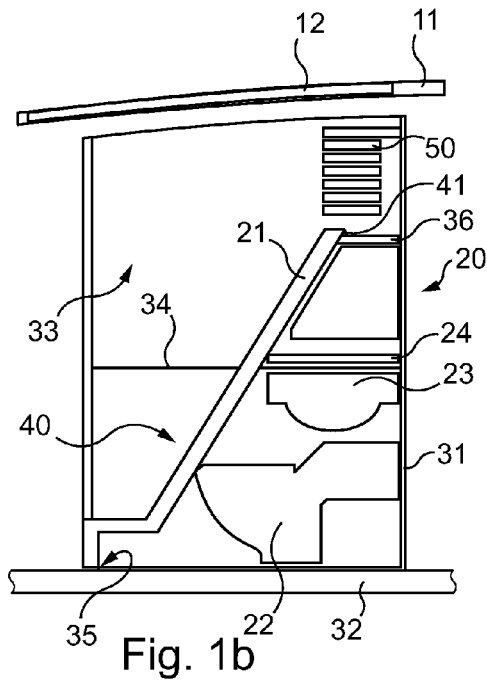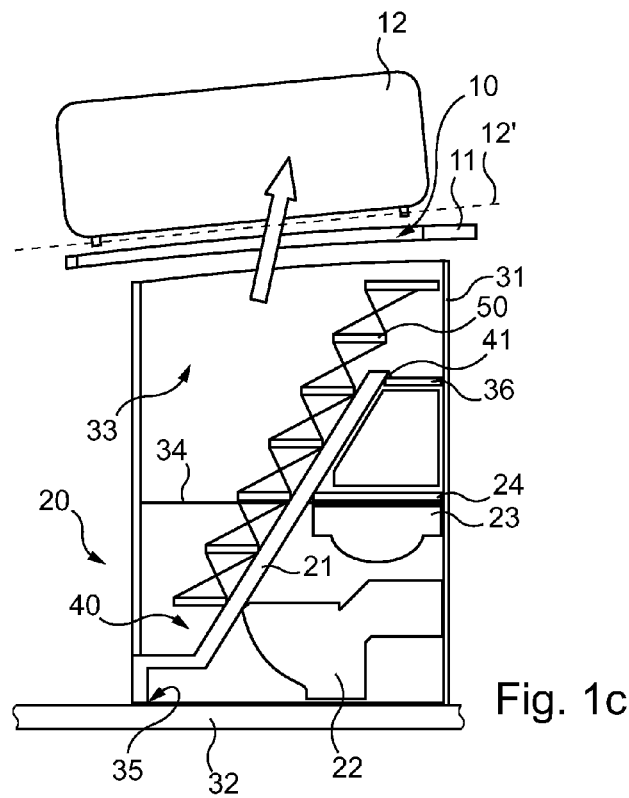

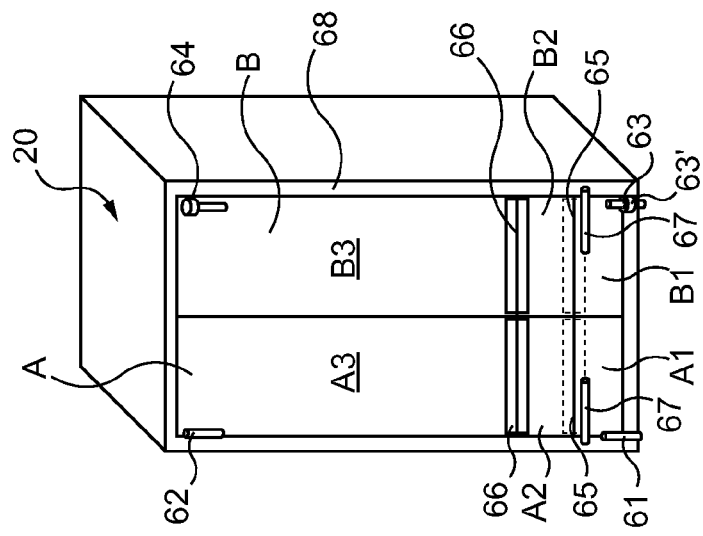
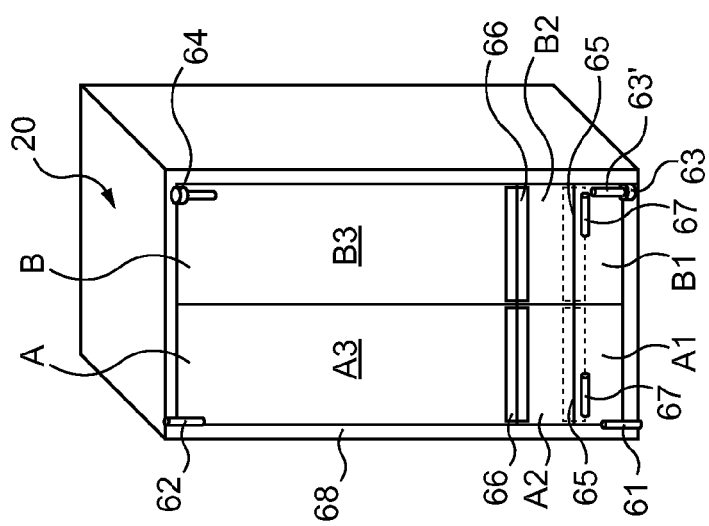
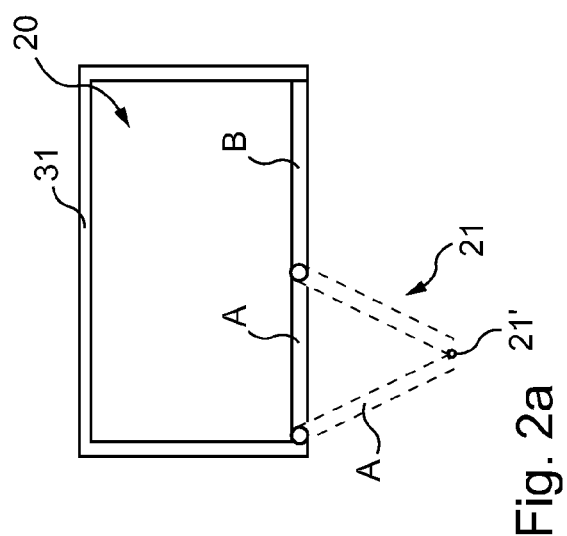

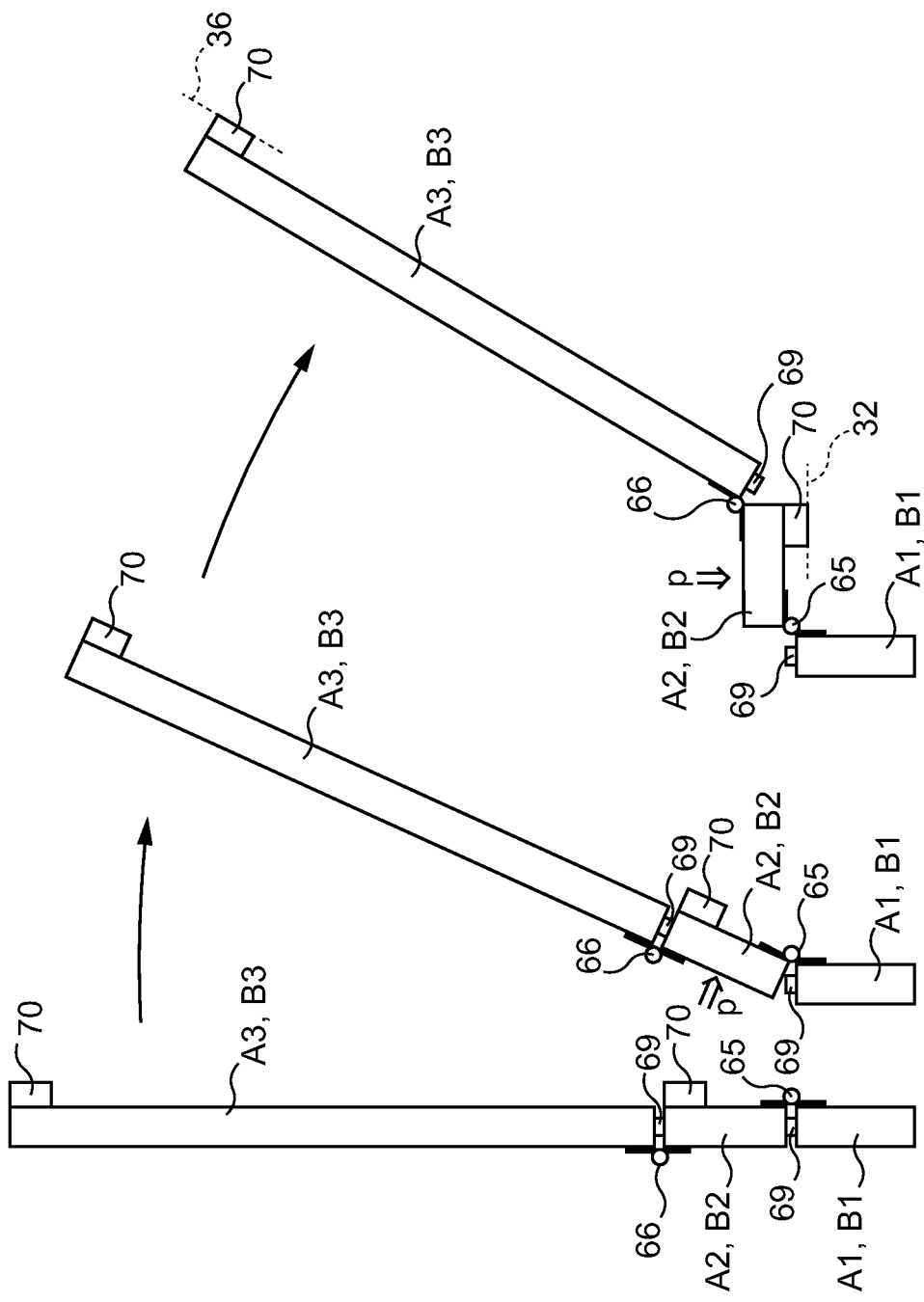

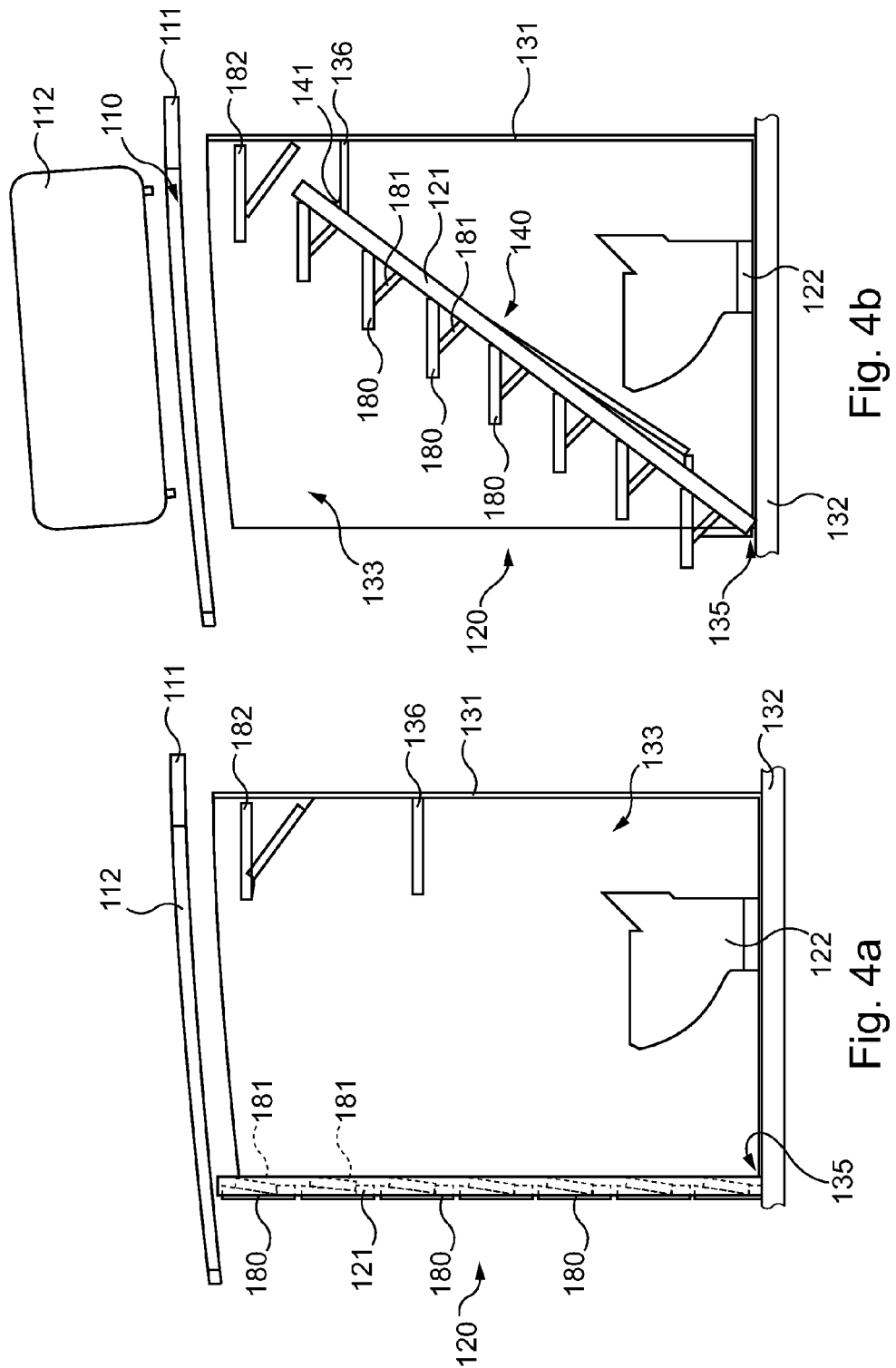

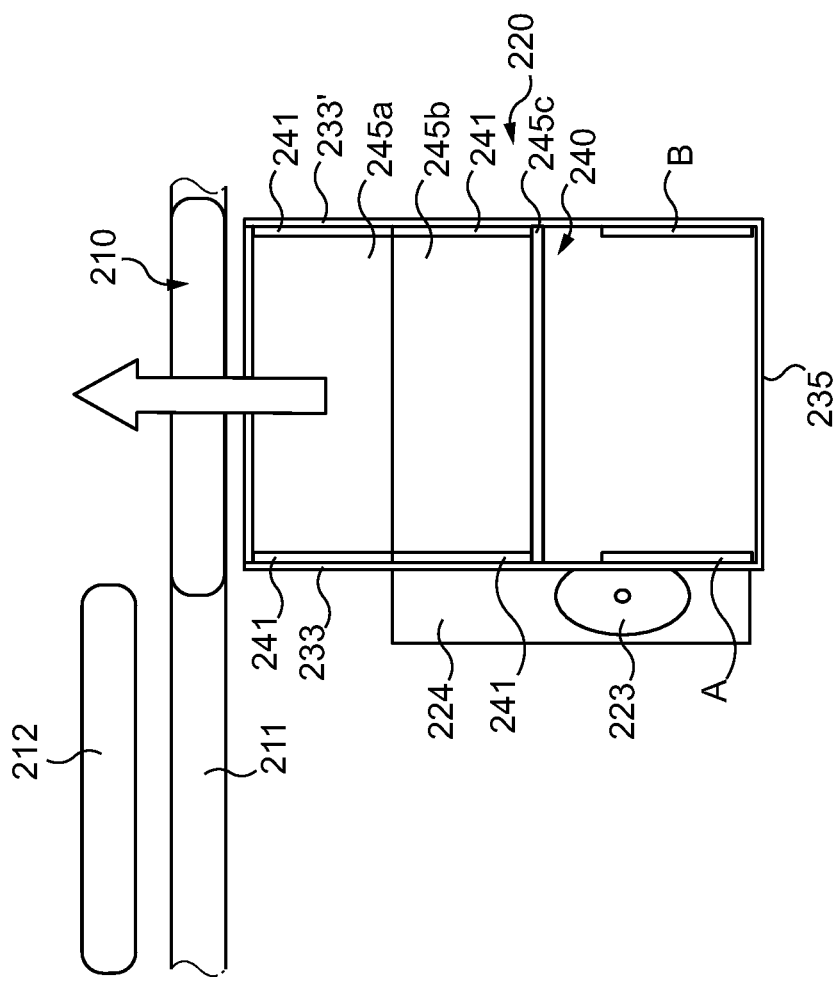
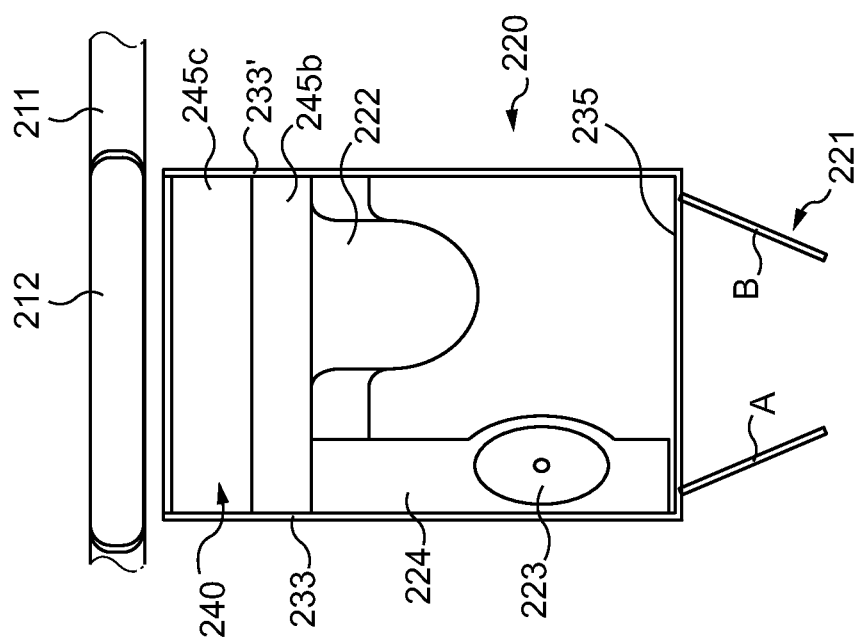
Fig. 5b
Fig. 5a

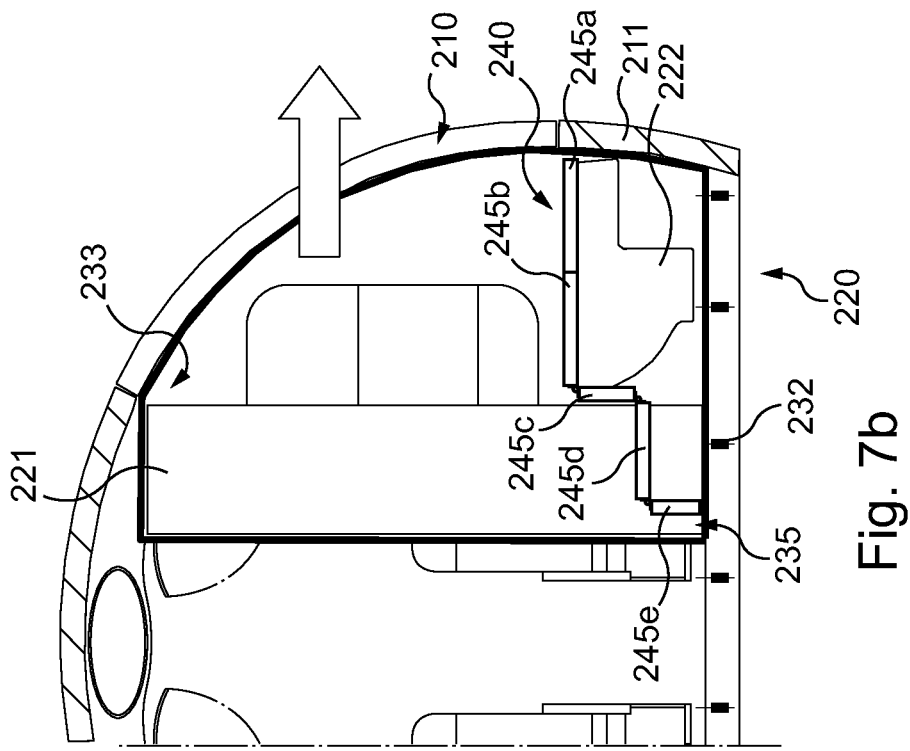
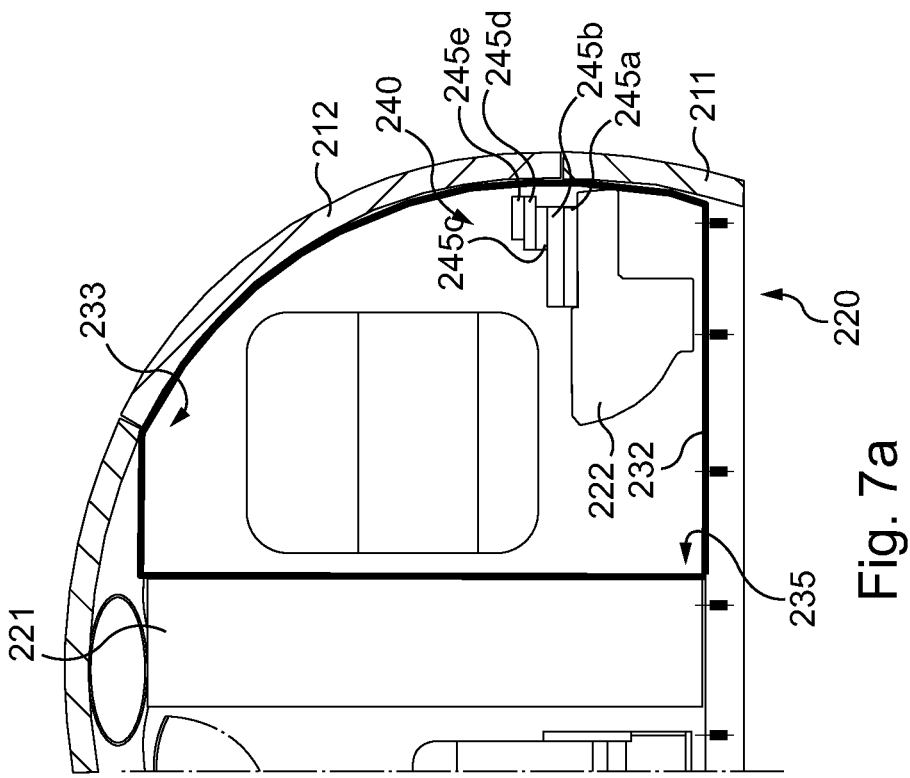

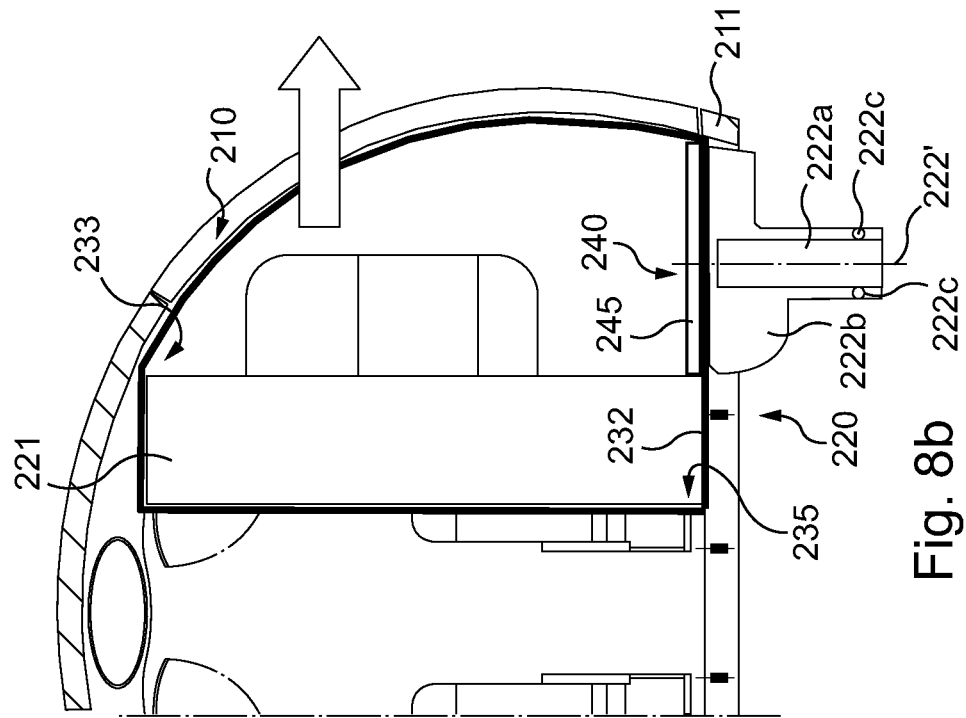
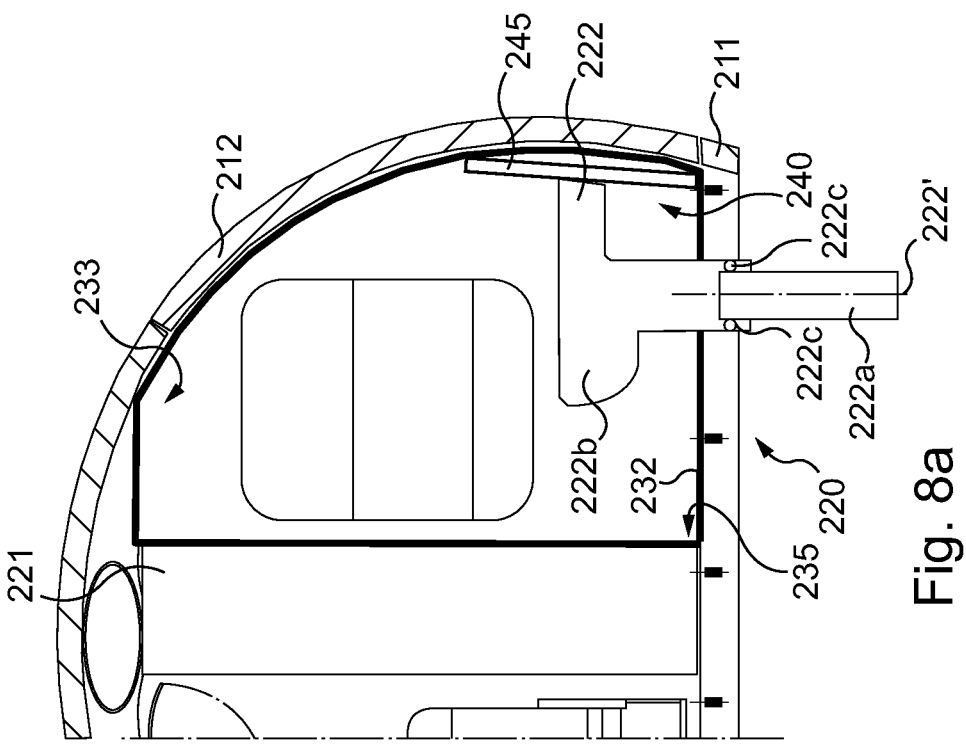

TOILET AREA FOR AN AIRCRAFT CABIN, IN PARTICULAR FOR A FLYING WING AIRCRAFT

CROSS-REFERENCES TO RELATED APPLICATIONS

This application claims the benefit of the French patent application No. 1262249 filed on Dec. 18, 2012, the entire disclosures of which are incorporated herein by way of reference.

BACKGROUND OF THE INVENTION

The present invention relates to a toilet area for an aircraft cabin.

It also relates to an aircraft and in particular a flying wing aircraft containing such a toilet area.

Generally, the present invention relates to the layout of an aircraft cabin with a view to optimizing the layout of the cabin.

In an aircraft, depending on the number of passengers, it is necessary to provide one or more toilet area installations in the aircraft cabin. A toilet area typically comprises an access door and houses a toilet bowl, as well as generally a washbasin, a work surface and a cupboard.

In a cabin of a conventional aircraft with a cylindrical fuselage, two toilet area installations are provided for example at the front of the cabin and two toilet area installations are provided at the rear of the cabin.

However, the installation of a toilet area in the cabin is costly in terms of space in the cabin, and in particular in the number of passenger seats.

Typically, a toilet area costs four passenger seats in the aircraft cabin.

Also, evacuation exits must be provided in an aircraft in sufficient number with respect to the number of passengers in the aircraft.

For each evacuation exit, an evacuation area must be provided in the cabin, clear of all equipment and in particular of passenger seats.

For example, in the cabin of a conventional aircraft with a cylindrical fuselage, the evacuation exits are arranged in pairs at the front of the cabin, on the left and right of the fuselage, and at the rear of the cabin, on the left and right of the fuselage.

In view of the space needed to be kept clear in front of each evacuation exit, the installation of such an evacuation exit costs passenger seats, for example about four or five passenger seats per evacuation exit.

SUMMARY OF THE INVENTION

The purpose of the present invention is to optimize the layout of an aircraft cabin.

For this purpose, the present invention relates to a toilet area for an aircraft cabin, comprising an access door and housing a toilet bowl.

According to the invention, the toilet area comprises an evacuation exit, the access door occupying a closed position in the toilet area in a toilet configuration of said toilet area and a folded position in the toilet area in an evacuation configuration of said toilet area.

Thus, by incorporating an evacuation exit into the toilet area, space is gained in the aircraft cabin by positioning the evacuation exit in a place in the cabin already occupied by the toilet area.

This incorporation of an evacuation exit into the toilet area is made possible through the complementary nature of the toilet configuration and the evacuation configuration of the toilet area.

In fact, the use of the toilet area in toilet configuration is only possible during aircraft boarding and disembarkation procedures and in aircraft cruising phase. The use of the toilet area in toilet configuration during taxiing (also called Taxiway) and take-off phases and also during aircraft descent and landing phases is prohibited.

Conversely, an evacuation procedure is only operational during the taxi, take-off, descent and landing phases.

Also, the conversion of the toilet area into evacuation configuration is simple to execute, since the access door is folded into the toilet area to create a clear passage for the passengers in the direction of the evacuation exit, with no obstacles obstructing their progress towards the evacuation exit.

According to an embodiment, the toilet area comprises means forming a walkway occupying a storage position in the toilet configuration and a deployed position above the toilet bowl in the evacuation configuration.

The means forming a walkway thus make it possible to disregard the presence of the toilet bowl in the toilet area in order to provide a passage towards the inside of the toilet area in the evacuation configuration.

The means forming a walkway thus make it possible to conceal at least the toilet bowl in the evacuation configuration from the sight of the passengers during evacuation.

In practice, the means forming a walkway comprise sealing joints interacting with walls of the toilet area when the means forming a walkway are deployed above the toilet bowl.

The presence of sealing joints makes it possible in the evacuation configuration to isolate a space containing the toilet bowl from the rest of the aircraft cabin, so as to prevent in particular the spread of foul smells.

Preferably, the means forming a walkway extend over the entire width of the toilet area.

During evacuation, and in particular in the presence of smoke, the means forming a walkway makes it possible to define, with the walls of the toilet area, a clearly identifiable passage for the passengers with no risk of mistaking the route towards the evacuation exit.

In a practical embodiment, the means forming a walkway comprise the access door, the access door in the folded position extending above the toilet bowl, substantially along an inclined plane between a threshold of the toilet area and close to a back wall of the toilet area, the back wall being opposite the access door in closed position, the evacuation exit being arranged in a ceiling of the toilet area.

The access door is thus not only folded in the evacuation configuration but also forms means forming a walkway for the evacuation of passengers above the toilet bowl.

In an embodiment, a foldaway stairway is fixed close to the evacuation exit, the foldaway stairway occupying a position folded against the ceiling in the toilet configuration and a position deployed along the access door in folded-down position in the evacuation configuration.

Thus, a stairway deployed along the inclined plane formed by the access door makes it possible to facilitate the progress of passengers in the toilet area with a view to evacuation through the evacuation exit.

Also, since the stairway is foldaway, it does not hinder the use of the toilet area in toilet configuration.

Alternatively, the access door comprises a series of steps distributed over the height of the access door, each step occupying a substantially vertical position, extending in the plane of the access door in closed position of the toilet area, and a substantially horizontal position, projecting from the inclined plane of said access door in the folded position in said toilet area.

Thus, steps forming a stairway can be directly incorporated into the access door.

In practice, the access door comprises at least three panels arranged over the height of the access door, the panels being articulated with respect to one another along a substantially horizontal axis of articulation, a first panel and a second panel of said at least three panels respectively forming a riser and a step in the folded position of the access door.

Thus, the access door can present at least one step of the stairway, facilitating the progress of passengers along the access door in the evacuation configuration.

In an embodiment, the toilet area also comprises equipment selected from a washbasin, a work surface and a cupboard, the equipment being movable along a rail fixed to a side wall of the toilet area, the equipment being movable between a usage position and a stowed position, the equipment being placed in the stowed position close to the back wall of the toilet area, beneath the access door in the folded position.

The stowed position of the equipment beneath the access door in the folded position makes it possible to clear the toilet area of the presence of this equipment. The toilet area thus acquires, between its side walls, sufficient space to allow for the progress of passengers towards the evacuation exit, free from any obstacle.

According to another embodiment of the invention, the access door in the folded position extends against at least one side wall of the toilet area, the means forming a walkway comprising one or more panels stored behind the toilet bowl in the toilet configuration and extending substantially horizontally over the toilet bowl in the evacuation configuration, the evacuation exit being arranged in a back wall of the toilet area, the back wall being opposite the access door in closed position.

The toilet area thus permits the evacuation of passengers through an evacuation exit in a side wall of the toilet area, only requiring progress of the passengers along a substantially horizontal plane extending above the toilet bowl.

Preferably, the toilet bowl is mounted movably in translation in the toilet area between a usage position in the toilet configuration and a substantially retracted position in a floor of the toilet area in the evacuation configuration.

This mounting of the toilet bowl movably in translation allows for a reduction in the height of the means forming a walkway extending substantially horizontally over the toilet bowl in the evacuation configuration.

Access to the evacuation exit is thus facilitated.

This evacuation exit can also open as closely as possible to the floor of the toilet area.

In a practical embodiment, the toilet area also comprises equipment selected from a washbasin, a work surface and a cupboard, the equipment being movable between a usage position projecting from a side wall of the toilet area in the toilet configuration and a retracted position in the side wall of the toilet area in the evacuation configuration.

The retracted position of the equipment thus makes it possible to clear the toilet area of any obstacles, preventing the progress of passengers towards the evacuation exit from being obstructed.

The present invention also relates to an aircraft comprising at least one toilet area for an aircraft cabin as described above.

The layout of the cabin of such an aircraft thus makes it possible to free space in the cabin, which can be exploited to add passenger seats.

The present invention relates in particular to a flying wing aircraft comprising a toilet area as described above.

The incorporation of a toilet area as described above is particularly advantageous for a flying wing aircraft, which requires the evacuation of passengers through the roof of the flying wing.

Other features and advantages of the invention will become apparent from the following description.

BRIEF DESCRIPTION OF THE DRAWINGS

In the attached drawings, given as non-limitative examples:

FIGS. 1a, 1b, 1c diagrammatically show a toilet area according to a first embodiment of the invention, which can be converted between a toilet configuration and an evacuation configuration;

FIGS. 2a, 2b, 2c diagrammatically show an example of an access door for the toilet area in FIG. 1a;

FIGS. 3a, 3b, 3c show the operation of the access door in FIG. 2c between a closed position and a folded position;

FIGS. 4a, 4b diagrammatically show a toilet area according to a second embodiment of the invention, which can be converted between a toilet configuration and an evacuation configuration;

FIGS. 5a, 5b diagrammatically show a top view of a toilet area according to a third embodiment of the invention, which can be converted between a toilet configuration and an evacuation configuration;

FIGS. 7a and 7b are analogous to FIGS. 6a and 5b and show a first alternative of the third embodiment of the invention, and FIGS. 8a and 8b are analogous to FIGS. 6a and 6b and show a second alternative of the third embodiment of the invention.

DETAILED DESCRIPTION OF THE PREFERRED EMBODIMENTS

Figure 6B:
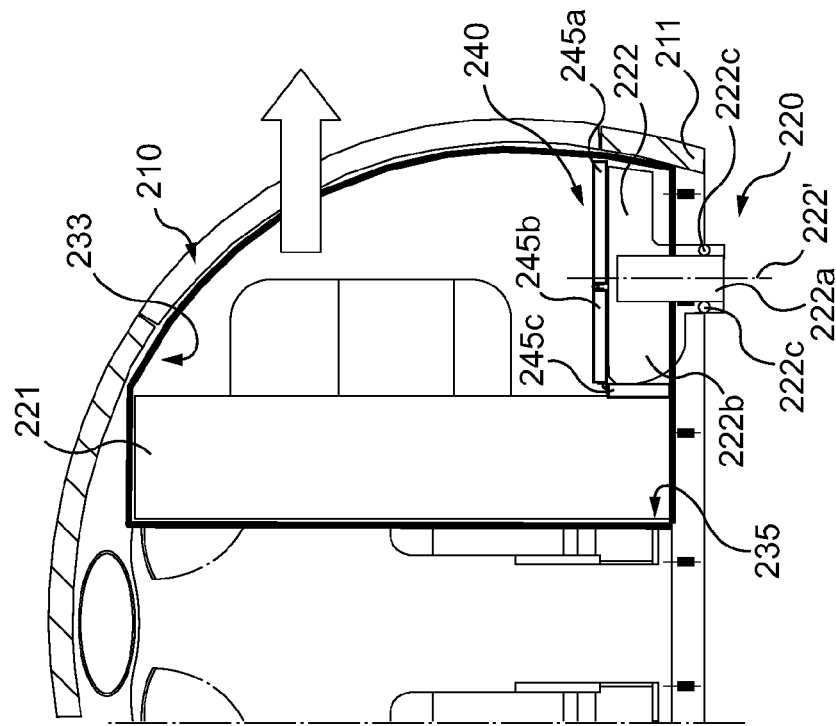
FIGS. 6a, 6b are analogous to FIGS. 5a and 5b, diagrammatically showing a side view of the toilet area according to the third embodiment of the invention.

A description will be given of a first embodiment of a toilet area for an aircraft cabin with reference to FIGS. 1a, 1b and 1c.

In this non-limitative embodiment, the aircraft is a flying wing aircraft.

A flying wing aircraft is distinguished from a conventional aircraft with a cylindrical fuselage in that the cabin is wide and relatively short in the longitudinal direction of the aircraft, corresponding to its direction of travel. An exemplary wing aircraft is disclosed in commonly assigned U.S. patent application Ser. No. 12/509,906, now U.S. Pat. No. 8,251,310 B2, which is incorporated by reference in its entirety.

In a flying wing aircraft, it is impossible to provide evacuation exits in side walls of the cabin, as the side walls do not open directly to the outside of the aircraft.

In fact, the side walls of the cabin open at best onto the thick wing of the flying wing aircraft in which the cabin is contained.

In this type of aircraft, one or more evacuation exits can then be provided in the roof of the cabin, which is substantially horizontal or has a slight slope.

Thus, as shown in FIG. 1c, an evacuation exit 10 is provided in the roof 11 of the flying wing aircraft.

The evacuation exit 10 can be closed by an evacuation door 12.

It will be noted that the evacuation door 12 may include a window making it possible to see the outside of the aircraft.

In the embodiment shown in FIG. 1c, the evacuation door 12 is mounted pivoting along an axis of pivot 12', here substantially horizontal.

Opening of the evacuation door 12 along the axis of pivot 12' may make use of compensation cylinders in a known manner in order to facilitate its upward opening movement.

Preferably, the axis of pivot 12' runs along a longitudinal edge of the evacuation door 12.

As clearly shown diagrammatically in FIGS. 1a-1c, the evacuation exit 10 is incorporated into a toilet area 20.

In practice, the evacuation door 12 is sufficiently thick to withstand pressure loads in particular.

This evacuation door includes a finishing trim which extends substantially in the same plane as the trim of the cabin ceiling and thus forms with the roof 11 the ceiling of the toilet area 20.

The toilet area 20 comprises an access door 21, intended, in a closed position to isolate the toilet area 20 from the rest of the aircraft cabin.

The toilet area houses a toilet bowl 22 and, in this embodiment, different pieces of equipment such as a washbasin 23, a work surface 24 and a cupboard 25.

These different pieces of equipment are conventional in a toilet area for an aircraft cabin and need not be described in greater detail here.

In this embodiment, the toilet bowl 22 is arranged against a back wall 31 of the toilet area 20, opposite the access door 21 as shown in FIG. 1a.

The toilet bowl 22 is also arranged close to a floor 32.

The different pieces of equipment, shown in FIG. 1a in a usage position, are mounted on a side wall 33 of the toilet area 20.

In the embodiment shown in FIGS. 1a-1c, the washbasin 23 and the work surface 24 are movable along a rail 34 fixed to the side wall 33 of the toilet area 20.

The pieces of equipment are thus movable between the usage position as shown in FIG. 1a, in which they are distributed depending on their usage against the side wall 33 of the toilet area 20, and a stowed position as shown in FIGS. 1b and 1c.

In this stowed position, the washbasin 23 and the work surface 24 are arranged close to the back wall 31 of the toilet area 20, above the toilet bowl 22.

Similarly, in this stowed position, the cupboard 25 is moved from its position suspended against the side wall 33 of the toilet area 20 into a position over the work surface 24, above the toilet bowl 22.

Of course, the cupboard 25 can also be mounted movably on a rail fixed to the side wall 33 of the toilet area 20, so that the cupboard 25 is movable between a usage position and a stowed position close to the back wall 31 of the toilet area 20.

In this embodiment, the toilet area also contains a shelf 36 fixed to the back wall 31 and to the side walls 33 of the toilet area 20. The different pieces of equipment are arranged beneath the shelf 36 in the stowed position.

The shelf 36 thus extends above the toilet bowl 22.

As shown in FIG. 1a, when the toilet area 20 is in a toilet configuration, the access door 21 occupies a closed position of the toilet area 20, at the threshold 35 of the toilet area 20.

The access door 21 can thus open and close in the conventional way in order to allow for use of the toilet area 20 in the toilet configuration.

It will be noted in particular that the toilet area 20 can be isolated from the cabin thanks to seals mounted in the upper part of the side wall 33 and the back wall 31 to come into contact with the ceiling of the toilet area formed by the roof 11 and the evacuation door 12 of the flying wing aircraft.

In an evacuation configuration of the toilet area, as shown successively in FIGS. 1b and 1c, the access door 21 occupies a folded position in the toilet area 20.

The access door 21 thus forms means forming a walkway 40 which occupies a stored position in the toilet configuration, corresponding in this embodiment to a closed position of the access door 21, and a deployed position above the toilet bowl 22 in the evacuation configuration.

Thus, the access door 21 in the folded position extends above the toilet bowl 22, substantially along an inclined plane between the threshold 35 of the toilet area 20 and close to the back wall 31 of the toilet area 20.

The access door 22 also extends over the entire width of the toilet area 20, between the side walls (only side wall 33 being shown in FIGS. 1a-1c) of the toilet area 20.

A more detailed description will follow of passing the access door 21 from the closed position to the folded position in the toilet area 20.

In this embodiment, the access door 21 extends from the threshold 35 to the shelf 36. Thus, the access door 21 extends, in this folded position, above the toilet bowl 22 and also the washbasin 23, the work surface 24 and the cupboard 25 in their stowed position.

Of course, in the absence of a shelf 36, the access door 21 could butt directly against the back wall 31 of the toilet area in evacuation configuration.

Preferably, in order to isolate the space housing the toilet bowl 22 from the rest of the toilet area 20 in the evacuation configuration, the means forming a walkway 40, here comprising the access door 21, comprise sealing joints interacting with walls of the toilet area 20 when the means forming a walkway 40 are deployed above the toilet bowl 22.

As clearly shown in FIG. 1c, the access door 21 includes in particular sealing joints 41 intended to interact with the shelf 36 fixed to the back wall 31.

Similarly, the access door 21 may include sealing joints (not shown) along the longitudinal edges in order to interact with the side walls (only side wall 33 being shown in FIGS. 1a-1c) of the toilet area 20.

In the embodiment shown in FIGS. 1a to 1c, a foldaway stairway 50 is fixed close to the evacuation exit 10, here against the back wall 31 of the toilet area.

The foldaway stairway 50 thus occupies a position folded against the ceiling of the toilet area 20, and in this embodiment, between the shelf 36 and the ceiling formed by the roof 11 and the evacuation door 12.

Thus, the foldaway stairway 50 can, in the toilet configuration of the toilet area 20, be substantially concealed from the view of users of the toilet area 20.

As an example embodiment, the foldaway stairway 50 in the position folded against the ceiling can be locked so as to prevent its untimely deployment or any malicious act.

In the evacuation configuration of the toilet area 20, the foldaway stairway 50 occupies a deployed position along the access door 21 in folded position.

In the embodiment shown in FIG. 1c, the foldaway stairway 50 is of the telescopic type. The foldaway stairway 50 is deployed from the ceiling of the toilet area 20, along the access door 21, forming an inclined plane. For example, the steps are deployed along side rails (not shown).

The side rails thus form runners capable of absorbing the forces exerted on the steps of the foldaway stairway 50 during usage.

Thus, the foldaway stairway 50 exerts little or no force on the access door 21 in an inclined plane.

Of course, other types of foldaway stairways 50 could be implemented in the embodiment shown in FIGS. 1a-1c.

In particular, if the height of the toilet area 20 so permits, the foldaway stairway 50 can be a stairway arranged parallel to the evacuation door 12 in the storage position and, for example, folded in two parts on the principle, for example, of a stepladder.

A description will now be given with reference to FIGS. 2a-2c and 3a-3c of an example of implementation of an access door 21 which is movable between a closed position and a folded position in the toilet area 20.

In the embodiment shown in FIGS. 2a to 2c, the access door 21 includes two leaves A, B.

FIG. 2a shows the access door 21 occupying a closed position of the toilet area 20 in a toilet configuration.

In the closed position, the two leaves A, B of the access door 21 extend substantially in a vertical plane opposite the back wall 31 of the toilet area 20.

FIG. 2a also shows, in dotted lines, the access door 21 in an open position allowing for the passage of people to use the toilet area 20 in toilet configuration.

In this embodiment, the two leaves A, B of the access door 21 are articulated with respect to one another along a common vertical axis 21'.

A first leaf A comprises a lower vertical hinge pin 61 and an upper vertical hinge pin 62.

The lower and upper vertical hinge pins 61, 62 are coaxial and define a vertical axis of articulation of the first leaf A of the access door 21, along the longitudinal edge of the first leaf A opposite the common vertical axis 21' of the two leaves A, B.

The second leaf B includes a lower guide wheel 63 and an upper guide wheel 64.

The lower and upper guide wheels 63, 64 are arranged on the same vertical axis and are capable of guiding, along respectively lower and upper guide rails (not shown), the movement of the second leaf B, at the longitudinal edge of the second leaf B opposite the common vertical axis 21'.

The system for opening and closing an access door 21 with two leaves A, B articulated about common vertical axis 21' and interacting with a lower rail and an upper rail is known to a person skilled in the art and need not be described in greater detail here.

In order to allow for the movement of the access door 21 from the closed position to a folded position in the toilet area 20, the access door 21 comprises at least three panels arranged over the height of the access door 21.

In this embodiment where the access door 21 includes two leaves A, B, the access door 21 comprises six panels, three panels A1, A2, A3 constituting the first leaf A and three panels B1, B2, B3 constituting the second leaf B.

A description will now be given of the assembly of the three panels A1, A2, A3 for the first leaf A, an analogous assembly being implemented for the three panels B1, B2, B3 of the second leaf B.

The first panel A1 and the second panel A2 are arranged vertically one above the other over the height of the access door 21 and are articulated with respect to one another along a first horizontal axis of articulation 65.

This first horizontal axis of articulation 65 is constituted by an internal hinge 65, i.e. extending over the width of the first leaf A, on the internal face of the access door 21, towards the interior of the toilet area 20.

The second panel A2 and the third panel A3 are arranged vertically over the height of the access door 21 and are articulated with respect to one another along a second horizontal axis of articulation 66.

The second horizontal axis of articulation 66 is constituted by an external hinge 66, extending in the width of the first leaf A, on the external face of the access door 21, towards the exterior of the toilet area 20.

Finally, the first panel A1 of the leaf A, intended to form the bottom part of the access door 21, comprises a horizontal latching pin 67, movable between a position retracted into the first panel A1 as shown in FIG. 2b and a position projecting from the first panel A1 as shown in FIG. 2c. The horizontal latching pin 67 interacts in this projecting position with a seating of complementary shape in the frame 68 of the access door 21.

The first and second panels A1, A2, B1, B2 have a substantially equal height in the vertical direction of the access door 21 and very much less than the height of the third panels A3, B3.

As a purely illustrative example, for an access door with a height of the order of 1900 mm, the height of the first and second panels A1, A2, B1, B2 is comprised between 150 and 200 mm.

The height of the third panel A3, B3 is then comprised between 1500 and 1600 mm.

FIG. 2b shows the access door 21 in a closed position for the toilet area 20 in a toilet configuration.

In this toilet configuration, the lower and upper hinge pins 61, 62 are locked into the frame 68 of the access door 21 in order to allow pivoting of the first leaf A about the vertical axis of articulation along the longitudinal edge opposite the common vertical axis 21' of the two leaves A, B.

The lower and upper guide wheels 63, 64 are also arranged in the respectively lower and upper guide rails.

The horizontal latching pin 67 of each leaf A, B is housed in a retracted position in the first panel A1, B1 of each leaf A, B.

FIG. 3a also shows the access door 21 in the closed position for the toilet area 20 in a toilet configuration.

In order to hold the first, second and third panels A1-A3, B1-B3, vertically over the height of the access door 21, magnets 69 are arranged for example at the level of each internal hinge 65 and external hinge 66.

The access door 21 is then in the toilet configuration of the toilet area 20 capable of opening and closing on the principle described above with reference to FIG. 2a.

Also, FIG. 2c shows the access door 21 in a phase of preparation for conversion of the toilet area 20 into an evacuation configuration.

The upper vertical hinge pin 62 of the first leaf A is unlocked. For this purpose, the upper vertical hinge pin 62 is for example moved vertically from a projecting position as shown in FIG. 2b, interacting with the frame 68 of the access door 21, to a retracted position in the third panel A3 of the first leaf A as shown in FIG. 2c.

Similarly, the upper guide wheel 64 is released from the upper guide rail. As shown in FIG. 2c, the upper guide wheel 64 is then arranged inside the third panel B3 of the second leaf B.

In the lower part of the access door 21, at the level of the threshold 35 of the toilet area 20, the lower vertical hinge pin 61 is held in position. Preferably, at the level of the lower guide wheel 63 of the second leaf B, a pin 63' is moved vertically in the direction of the threshold 35 in order to interact with a seating provided for example in the lower guide rail and thus prevent any sliding of the second leaf B along the lower guide rail.

Finally, the horizontal latching pin 67 of each first panel A1, B1 of each leaf A, B is arranged in the projecting position as shown in FIG. 2c, thus interacting with the frame 68 of the access door 21.

A description will now be given of the movement of the access door 21 thus configured in a folded position in the toilet area 20 with reference to FIGS. 3a-3c.

By exerting a push (arrow P), for example with the foot, on the second panel A2, B2 of each leaf A, B, the second panels A2, B2 pivot around the internal hinge 65 and the first panels A1, B1.

By continuing to exert a push on the second panels A2, B2, the third panels A3, B3 then pivot around the external hinge 66.

It is sufficient to open the internal 65 and external 66 hinges that the push P exerted by the foot is greater than the holding force of the magnets 69.

The movement of the access door 21 into the folded position is limited by stops 70 intended to abut walls of the toilet area 20.

Of course, the stops could alternatively be fixed to walls of the toilet area in order to establish zones of contact with the access door in the folded position.

In the folded position as shown in FIG. 3c, the first panels A1, B1 and the second panels A2, B2 respectively form a riser and a step.

Thus, the first panels A1, B1 remain in a vertical position, at the threshold 35 of the toilet area 20. The second panels A2, B2 are arranged substantially horizontally abutting the floor 32 of the toilet area 20.

Also, the third panels A3, B3 are arranged along an inclined plane in the toilet area 20. The upper ends of the third panels A3, B3 abut, as indicated above for example, the shelf 36 arranged on the back wall 31 of the toilet area 20.

Of course, the example of implementation of the access door 21 described above could be transposed to a door with only a single leaf and constituted by three panels arranged over the height of the access door.

The principle of conversion of the toilet area 20 from the toilet configuration to the evacuation configuration is as follows:

One of the flight attendants in charge of the aircraft cabin enters the toilet area 20 and optionally stows the different pieces of equipment against the back wall 31 of the toilet area 20 by relocating them on the guide rails.

The attendant then leaves the toilet area 20, closing the access door 21 and preparing it as shown in FIG. 2c.

The access door 21 is then tipped from the position shown in FIG. 3a to the position shown in FIG. 3c as described above.

The attendant then unlocks the foldaway stairway 50 and deploys it along the inclined plane of the access door 21 in the folded position.

The foldaway stairway 50 is then locked into the bottom part of the access door 21.

As clearly shown in FIG. 1c, in this position, the foldaway stairway 50 extends the step formed by the second panels A2, B2 of the access door 21 in the folded position.

The toilet area in evacuation configuration is then operational.

In the event of use to evacuate the aircraft, the attendant opens the evacuation door 12 in the ceiling of the toilet area 20.

A description will now be given with reference to FIGS. 4a and 4b of a second embodiment of a toilet area 120.

In this non-limitative example of implementation, the aircraft is a flying wing aircraft.

An evacuation exit 110 is provided in the roof 111 and may present a configuration identical to that described above with reference to FIGS. 1a-1c.

The toilet area 120 comprises an access door 121 intended, as shown in FIG. 4a, to isolate the toilet area 120 from the rest of the aircraft cabin.

For this second embodiment, FIGS. 4a, 4b illustrate a toilet area 120 housing only a toilet bowl 122.

Of course, different pieces of equipment could also be provided as described above in relation to the first embodiment, and in particular a washbasin, a work surface and a cupboard.

In an evacuation configuration of the toilet area 120, as shown in FIG. 4b, the access door 121 occupies a folded position in the toilet area 120.

As in the first embodiment, the access door 121 thus forms means forming a walkway 140 which occupy a storage position in the toilet configuration, corresponding in this second embodiment to a closed position of the access door 121, and a deployed position above the toilet bowl 122 in the evacuation configuration.

Thus, the access door 121 in the folded position extends above the toilet bowl 122, substantially along an inclined plane between the threshold 135 of the toilet area 120 and close to the back wall 131 of the toilet area 120.

The access door 121 also extends over the entire width of the toilet area 120, between the side walls.

In this embodiment, passing from the closed position to the folded position of the access door 121 can only be achieved by pivoting the access door 121 along a lower horizontal axis arranged at the level of the threshold 135 of the toilet area 120.

As a non-limitative example, the lower horizontal axis may be implemented by means similar to the horizontal latching pin 67 described above in relation to FIGS. 2b and 2c.

The access door 121 is also arranged with its upper end abutting against a shelf 136 fixed to the back wall 131 and to the side walls 133 of the toilet area 120.

Thus, in the folded position, the access door 121 extends all in one piece along an inclined plane between the threshold 135 and shelf 136 of the toilet area 120.

Of course, as in the first embodiment, the access door 121 may include peripheral sealing joints 141 to isolate the space containing the toilet bowl 122 from the rest of the cabin.

In this embodiment, the access door 121 comprises a series of steps 180 distributed over the height of the access door 121. As clearly shown in FIG. 4a, each step 180 occupies a substantially vertical position, extending in the plane of the access door 121 in closed position of the toilet area 120.

On the other hand, each step 180 occupies a substantially horizontal position, projecting from the inclined plane of the access door 121 in a folded position in the toilet area 120.

Thus, each step 180 can be folded away in the plane of the door so as not to obstruct use of the access door 121 in toilet configuration of the toilet area 120. Each step 180 is thus incorporated into the thickness of a panel constituting the access door 121.

On the other hand, when the access door 121 is placed in a folded position in the toilet area 120, above the toilet bowl 122, each step 180 is deployed around an articulation arm 181 fixed between each step and a panel constituting the access door 121.

The deployment of the steps 180 in horizontal position, projecting from the inclined plane of the access door 121, can be carried out manually, each step 180 locking automatically in abutment with the access door 121.

Alternatively, the deployment of the steps 180 can be carried out automatically and controlled simultaneously with the tipping of the access door 121 from its closed position to the folded position in the toilet area 120.

As shown in FIG. 4b, the toilet area 120 also preferably includes at least one fixed step 182 arranged in the top part of the toilet area 120 close to the roof 111 and to the evacuation door 112 forming the ceiling of the toilet area 120.

The fixed step 182 thus makes it possible to complete the stairway produced along the access door 121 in inclined position, which cannot extend as far as the ceiling of the toilet area 120.

It will of course be noted that the particular embodiment of the access door as shown in FIGS. 2a-2c and 3a-3c could be combined with the incorporation of a series of steps distributed over the height of the access door.

A description will now be given with reference to FIGS. 5a-5b et seq. of a third embodiment of a toilet area 220.

In this non-limitative example of implementation, the aircraft comprises a conventional cylindrical fuselage, the cabin extending for substantially lengthwise along the axis of the cylindrical fuselage of the aircraft.

As shown in FIGS. 5a and 5b, an evacuation exit 210 is provided in a side wall 211 of the aircraft. In this type of aircraft, the lateral flank of the fuselage is substantially vertical and opens onto the outside so that an evacuation exit 210 of the cabin can be incorporated into the side wall 211.

The evacuation exit 210 can be closed by an evacuation door 212.

Conventionally in this type of aircraft, the evacuation door 212 can be slidably mounted against an external surface of the side wall 211 of the fuselage of the aircraft. The movement of the evacuation door 212 is for example a circular translation movement controlled by an arm on a deformable parallelogram principle.

As a non-limitative example, the evacuation door 212 has a height of the order of 1900 mm.

Since this type of evacuation door 212 is well known, a detailed description of the functionality allowing it to open it against the side wall 211 of the aircraft need not be given here.

As clearly shown in FIGS. 5a and 5b, the evacuation exit 210 is incorporated into a toilet area 220. Thus, the evacuation exit 210 is arranged in a back wall of the toilet area, here constituted by a part of the side wall 211 of the fuselage.

The toilet area 220 houses a toilet bowl 222 and, in this embodiment a washbasin 223 incorporated into a work surface 224.

As shown in FIG. 5a, the toilet bowl 222 is arranged towards the back of the toilet area 220, here comprising the side wall 211 of the fuselage of the aircraft.

The different pieces of equipment, washbasin 223, work surface 224, are shown in FIG. 5a in a usage position, projecting from a side wall 233 of the toilet area 220.

The equipment is moreover movable between the usage position projecting from the side wall 233 of the toilet area 220 and a folded position in the side wall 233 of the toilet area as shown in FIG. 5b.

Thus, equipment of the washbasin 223, work surface 224 type is mounted for example on guide rails, substantially perpendicular to the side wall 233 of the toilet area 220, so as to be able to be moved with respect to the side wall 233 of the toilet area 220.

As clearly shown in FIG. 5b, the equipment is placed, in the evacuation configuration of the toilet area 220, outside the toilet area 220 so that the space between the side walls 233, 233' is left clear.

The toilet area 220 comprises an access door 221 here constituted by two leaves A, B mounted pivoting respectively along a vertical axis of the frame of the access door 221.

The two leaves A, B of the access door 221 thus pivot towards the outside of the toilet area 220, into the aircraft cabin.

As shown in FIG. 5a, when the toilet area 220 is in a toilet configuration, the access door 221 occupies a closed or open position of the toilet area 20, at the threshold 235 of the toilet area 220.

The access door 221 can thus open and close in the conventional way to allow for usage of the toilet area 220 in the toilet configuration.

On the other hand, in an evacuation configuration of the toilet area 220, as shown in FIG. 5b, the access door 221 extends in a folded position against a side wall 233, 233' of the toilet area 220.

In this embodiment in which the access door comprises two leaves A, B, each leaf A, B extends respectively against a side wall 233, 233' of the toilet area 220 in the evacuation configuration.

For each leaf A, B, the upper and lower pivot pins are retracted and each leaf A, B is capable of sliding along an upper and lower rail (not shown) arranged parallel to the side walls 233, 233'.

Alternatively, the two leaves A, B could be folded against one another against a single side wall of the toilet area in the evacuation configuration.

Of course, the access door could comprise just a single leaf, pivoting about a vertical axis to open and close the access door in the toilet configuration of the toilet area, and capable of sliding against one of the side walls of the toilet area in the evacuation configuration.

As clearly shown in 6a and 6b, means forming a walkway 240 in this embodiment comprise one or more panels 245 stored behind the toilet bowl 222 in the toilet configuration (FIG. 6a) and extending substantially horizontally over the toilet bowl 222 in the evacuation configuration (FIG. 6b).

Figure 6A:
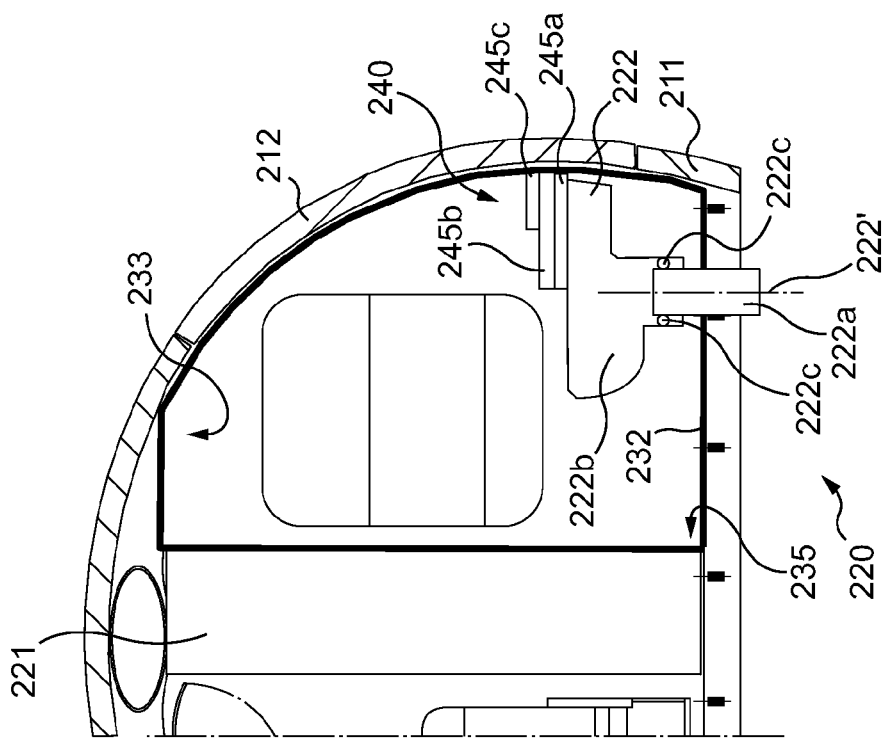

Also, in this embodiment, the toilet bowl 222 is mounted movably in translation in the toilet area 220, between a usage position in the toilet configuration as shown in FIG. 6a and a position substantially retracted into a floor 232 of the toilet area 220 in the evacuation configuration (FIG. 6b).

Thus, the toilet bowl 222 is mounted movably in translation along a substantially vertical axis 222' to be substantially retracted into the floor 232 of the toilet area 220.

In practice, the toilet bowl 222 comprises a substantially vertical pedestal 222a along which a part forming the bowl 222b slides.

Preferably, sealing joints 222c are provided between the pedestal 222a and the part forming the bowl 222b.

In this embodiment, the toilet bowl 222 is partially retracted into the floor 232 of the toilet area 220 and thus forms an additional thickness of the order of 150 to 200 mm above the floor 232 of the toilet area 220.

The means forming a walkway 240 here comprise a panel 245a firmly fixed to a rear part of the toilet bowl 222 and movable panels 245b, 245c.

In toilet configuration, the movable panels 245b, 245c are folded behind the toilet bowl 222.

In evacuation configuration, a first movable panel 245b is unfolded around the fixed panel 245a to cover the part forming the bowl 222b of the toilet bowl 222 and a second movable panel 245c is deployed around the first movable panel 245b to form a riser as shown in FIG. 6b. The movement of the second movable panel 245c is limited in rotation to 90° with respect to the first movable panel 245b.

Thus, the height of the second panel 245c is substantially equal to the height of the part of the toilet bowl 222 projecting above the floor 232 in the evacuation configuration.

Unfolding the movable panels 245b, 245c can be facilitated by fitting the second movable panel 245c with a handle (not shown).

In evacuation configuration, the toilet area 220 thus allows passengers to exit by passing over the means forming a walkway 240 thus arranged horizontally at the level of the evacuation exit 210.

Preferably, sealing joints 241 (see FIG. 5b) are provided on the edges of the panels 245a-245c to interact with the side walls 233, 233' of the toilet area 220 and to isolate the space housing the toilet bowl 222 from the rest of the aircraft cabin.

FIGS. 7a and 7b show a first alternative of the third embodiment described in FIGS. 6a and 6b.

Here, the toilet bowl 222 is mounted fixed close to the back of the toilet area, opposite the access door 221, and close to the floor 232.

In this embodiment, the means forming a walkway 240 include several panels 245a-245e stored behind the toilet bowl 222 in the toilet configuration of the toilet area 220.

These different panels 245a-245e are articulated with respect to one another in order, when deployed, to produce a stairway, here including two steps, as shown in the FIG. 7b.

As a non-limitative example, the means forming a walkway 240 include a panel 245a firmly fixed to the rear part of the toilet bowl 222, a first movable panel 245b intended to close the part forming the bowl 222a of the toilet bowl 222, a second movable panel 245c forming a first riser, a third movable panel 245d forming a second step and a fourth movable panel 245e forming a second riser coming into contact with the floor 232 of the toilet area 220 in evacuation configuration, close to the threshold 235 of the toilet area 220.

This first alternative makes it possible to avoid moving the toilet bowl 222 in vertical translation into the back wall 232 of the toilet area 220.

However, it requires passengers to pass over several steps to reach the evacuation exit 210.

Also, as clearly shown in FIG. 7b, the evacuation exit 210 is then high in the side wall 211 of the fuselage with respect to the floor 232 of the toilet area 220.

Conversely, FIGS. 8a, 8b show a second alternative of the third embodiment of the toilet area, in which the evacuation exit 210 extends in the side wall 211 of the fuselage as far as the floor 232 of the toilet area.

This second alternative is made possible thanks to mounting the toilet bowl 222 movable in translation along a vertical axis 222' as far as a retracted position entirely within the floor 232 of the toilet area 220 as shown in FIG. 8b.

The mounting of the toilet bowl 222 movable in translation is identical to that described above in relation to FIGS. 6a and 6b, but allows the toilet bowl 222 to be retracted completely into the floor 232 of the toilet area 220.

In this embodiment, the means forming a walkway 240 can then include a single panel 245 mounted vertically behind the toilet bowl 222, against the side wall 211 of the fuselage and the evacuation door 212, in the toilet configuration of the toilet area 220.

In evacuation configuration, the panel 245 is folded directly from its vertical position to a horizontal position above the toilet bowl 222 retracted into the floor 232 of the toilet area 220.

Of course, the means forming a walkway 240 could also be produced in this second alternative from two panels folded against one another to be stored behind the toilet bowl 222 in toilet configuration and deployed above the toilet bowl 222 in evacuation configuration.

The second alternative shown in FIG. 8b thus makes it possible to produce an evacuation exit 210 and an evacuation door 212 substantially identical to the evacuation doors equipping cylindrical fuselages of conventional aircraft.

Thus, the evacuation exit 210 is on the same level as the floor 232 of the toilet area 220, so that passengers being evacuated do not have to pass over steps to reach the evacuation exit 210 of the toilet area 220.

The conversion of the toilet area into evacuation configuration thus makes it possible to use the area occupied by the toilet area for the evacuation of passengers, if necessary.

The distance between the side walls of the toilet area must be sufficient to leave a statutory clear passageway of the order of 36 inches (914.4 mm) for the evacuation of passengers.

The incorporation of the evacuation exit into a toilet area thus makes it possible to make savings on the space needed for evacuation exits in the aircraft cabin, thus making it possible to increase the seating capacity for passengers in the aircraft cabin.

Tracks on the cabin floor, for example lights, can also be installed in the conventional way for the installation of each toilet area in order to signpost the evacuation exit.

Finally, it will be noted that, in an aircraft, only some of the toilet area installations can be fitted with an evacuation exit, conventional toilets being able to be kept permanently operational.

Of course, the different embodiments described above are only example embodiments and the features of these different embodiments can be implemented in various combinations.

Thus, for example, the movement of equipment along a rail in the first and second embodiments of the invention could be replaced by a principle of retracting the equipment into a side wall of the toilet area as described with reference to the third embodiment of the invention.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A toilet area for an aircraft cabin, comprising:
an access door, a toilet bowl, and an evacuation exit, said access door occupying a closed position in said toilet area in a toilet configuration of said toilet area and a folded position in said toilet area in an evacuation configuration of said toilet area, wherein said toilet area includes a walkway occupying a storage position in said toilet configuration and a deployed position above said toilet bowl in said evacuation configuration.

2. The toilet area according to claim 1, wherein said walkway includes at least one sealing joint interacting with a wall of said toilet area when said walkway is deployed above said toilet bowl.

3. The toilet area according to claim 1, wherein said walkway includes said access door, said access door in said folded position extending above said toilet bowl, substantially along an inclined plane between a threshold of said toilet area and close to a back wall of said toilet area, said back wall being opposite said access door in closed position, said evacuation exit being arranged in a ceiling of said toilet area.

4. The toilet area according to claim 3, wherein a foldaway stairway is fixed close to said evacuation exit, said foldaway stairway occupying a position folded against said ceiling in said toilet configuration and a deployed position along said access door in a folded position in said evacuation configuration.

5. The toilet area according to claim 3, wherein said access door includes a plurality of steps distributed over a height of said access door, each step occupying a substantially vertical position, extending in the plane of said access door in a closed position of said toilet area, and a substantially horizontal position, projecting from the inclined plane of said access door in a folded position in said toilet area.

6. The toilet area according to claim 3, wherein said access door includes at least three panels arranged over the height of the access door, said panels being articulated with respect to one another along a substantially horizontal axis of articulation, a first panel and a second panel of said at least three panels respectively forming a riser and a step in said folded position of the access door.

7. The toilet area according to claim 3, further comprising equipment selected from a washbasin, a work surface and a cupboard, said equipment being movable along a rail fixed to a side wall of said toilet area, said equipment being movable between a usage position and a stowed position, said equipment being placed in said stowed position close to the back wall of said toilet area, beneath the access door in said folded position.

8. The toilet area according to claim 1, wherein the access door in said folded position extends against at least one side wall of said toilet area, said walkway comprising one or more panels stored behind the toilet bowl in said toilet configuration and extending substantially horizontally over the toilet bowl in said evacuation configuration, the evacuation exit being arranged in a back wall of said toilet area, said back wall being opposite said access door in closed position.

9. The toilet area according to claim 8, wherein said toilet bowl is mounted movably in translation in said toilet area, between a usage position in said toilet configuration and a substantially retracted position in a floor of said toilet area in said evacuation configuration.

10. The toilet area according to claim 8, further comprising equipment selected from a washbasin, a work surface and a cupboard, said equipment being movable between a usage position projecting from a side wall of said toilet area in the toilet configuration and a retracted position in said side wall of said toilet area in said evacuation configuration.

11. An aircraft, having at least one toilet area for an aircraft cabin, comprising:

an access door, a toilet bowl, and an evacuation exit, said access door occupying a closed position in said toilet area in a toilet configuration of said toilet area and a folded position in said toilet area in an evacuation configuration of said toilet area, wherein said toilet area includes a walkway occupying a storage position in said toilet configuration and a deployed position above said toilet bowl in said evacuation configuration.

12. A flying wing aircraft, having at least one toilet area for an aircraft cabin, comprising:

an access door, a toilet bowl, and an evacuation exit, said access door occupying a closed position in said toilet area in a toilet configuration of said toilet area and a folded position in said toilet area in an evacuation configuration of said toilet area, wherein said toilet area includes a walkway occupying a storage position in said toilet configuration and a deployed position above said toilet bowl in said evacuation configuration.

* * * * *